(12) United States Patent
Sathyamurthy et al.

(10) Patent No.: US 9,311,446 B1
(45) Date of Patent: Apr. 12, 2016

(54) MULTICAST TRANSMISSION FOR POWER MANAGEMENT IN AN AD-HOC WIRELESS SYSTEM

(75) Inventors: Dhanasekaran Sathyamurthy, Chennai (IN); Sivakumar Panneerselvam, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 1064 days.

(21) Appl. No.: 12/727,610

(22) Filed: Mar. 19, 2010

(51) Int. Cl.
*H04Q 7/24* (2006.01)
*G06F 17/00* (2006.01)
*H04L 12/18* (2006.01)
*H04W 40/24* (2009.01)

(52) U.S. Cl.
CPC .............. *G06F 17/60* (2013.01); *H04L 12/189* (2013.01); *H04W 40/244* (2013.01)

(58) Field of Classification Search
USPC .................. 370/310–315; 340/7.32–7.34; 455/422.1–460
See application file for complete search history.

(56) References Cited

U.S. PATENT DOCUMENTS

| | | | |
|---|---|---|---|
| 5,754,870 A | | 5/1998 | Pollard |
| 5,790,536 A | | 8/1998 | Mahany |
| 6,192,230 B1 | * | 2/2001 | van Bokhorst et al. .... 455/343.3 |
| 6,421,714 B1 | * | 7/2002 | Rai et al. ...................... 709/217 |
| 6,570,857 B1 | | 5/2003 | Haartsen et al. |
| 6,580,704 B1 | | 6/2003 | Wellig et al. |
| 6,829,493 B1 | | 12/2004 | Hunzinger |
| 6,836,472 B2 | | 12/2004 | O'Toole et al. |
| 7,260,068 B2 | | 8/2007 | Hsieh et al. |
| RE40,032 E | | 1/2008 | van Bokhorst et al. |
| 7,457,271 B2 | | 11/2008 | Donovan |
| 7,457,973 B2 | | 11/2008 | Liu |
| 7,505,795 B1 | | 3/2009 | Lim et al. |
| 7,567,815 B2 | | 7/2009 | Nishikawa et al. |
| 7,577,114 B2 | | 8/2009 | Hsieh et al. |

(Continued)

FOREIGN PATENT DOCUMENTS

| | | |
|---|---|---|
| CN | 104145511 | 11/2014 |
| EP | 2157739 A1 | 2/2010 |

(Continued)

OTHER PUBLICATIONS

U.S. Appl. No. 12/705,267, filed Feb. 12, 2010, Panneerselvam, Sivakumar et al.

(Continued)

*Primary Examiner* — Marcus R Smith
*Assistant Examiner* — Omeed D Rahgozar
(74) *Attorney, Agent, or Firm* — DeLizio Law, PLLC

(57) ABSTRACT

In an ad-hoc wireless network, a single multicast message can be used to announce availability of queued data to one or more WLAN devices in the ad-hoc network. A wireless network device in the ad-hoc network can determine network identifiers associated with the other wireless network devices in the ad-hoc network for which the queued data is available. The wireless network device transmits the multicast message, which identifies the wireless network devices for which queued data is available, to indicate the wireless network devices that should remain in an active power state. On receiving the multicast message, a receiving WLAN device can read a network identifier bit associated with the receiving WLAN device to determine whether or not the receiving WLAN device should remain in the active power state. This can reduce transmission overhead and improve power savings, efficiency, and data reliability.

17 Claims, 8 Drawing Sheets

(56) References Cited

U.S. PATENT DOCUMENTS

| | | | |
|---|---|---|---|
| 7,634,275 | B2 | 12/2009 | Odman |
| 7,751,356 | B2 | 7/2010 | Kim et al. |
| 7,804,849 | B2 | 9/2010 | Mahany et al. |
| 7,864,720 | B2 | 1/2011 | Jeyaseelan |
| 7,881,755 | B1 | 2/2011 | Mishra et al. |
| 7,916,663 | B2 * | 3/2011 | Yee ............................ 370/254 |
| 7,978,638 | B2 | 7/2011 | Kim et al. |
| 7,995,507 | B2 | 8/2011 | Singh et al. |
| 8,014,370 | B2 | 9/2011 | Banerjea et al. |
| 8,023,522 | B2 | 9/2011 | Gobriel et al. |
| 8,045,494 | B2 | 10/2011 | Habetha et al. |
| 8,064,474 | B2 * | 11/2011 | Lynch et al. .................. 370/432 |
| 8,072,913 | B2 | 12/2011 | Desai |
| 8,089,964 | B2 | 1/2012 | Lo et al. |
| 8,094,595 | B2 | 1/2012 | Montojo et al. |
| 8,098,635 | B2 | 1/2012 | Montojo et al. |
| 8,099,047 | B2 | 1/2012 | David et al. |
| 8,112,650 | B2 | 2/2012 | Qing et al. |
| 8,233,456 | B1 | 7/2012 | Kopikare et al. |
| 8,233,462 | B2 | 7/2012 | Walton et al. |
| 8,526,346 | B1 | 9/2013 | Liu |
| 8,537,733 | B1 | 9/2013 | Panneerselvam et al. |
| 8,542,620 | B2 | 9/2013 | Sampathkumar |
| 8,576,761 | B1 | 11/2013 | Pitchaiah |
| 8,588,156 | B1 | 11/2013 | Liu |
| 8,611,268 | B1 | 12/2013 | Thandaveswaran |
| 8,744,496 | B2 | 6/2014 | Cave et al. |
| 8,755,313 | B2 | 6/2014 | Damnjanovic et al. |
| 9,049,658 | B2 | 6/2015 | Ponmudi et al. |
| 9,137,838 | B2 | 9/2015 | Liu |
| 9,185,655 | B2 | 11/2015 | Panneerselvam et al. |
| 2001/0031626 | A1 | 10/2001 | Lindskog et al. |
| 2002/0045435 | A1 | 4/2002 | Fantaske |
| 2002/0164963 | A1 | 11/2002 | Tehrani et al. |
| 2004/0085972 | A1 | 5/2004 | Warren et al. |
| 2004/0190467 | A1 | 9/2004 | Liu et al. |
| 2004/0259542 | A1 | 12/2004 | Viitamaki et al. |
| 2005/0135284 | A1 | 6/2005 | Nanda et al. |
| 2005/0136914 | A1 | 6/2005 | van Kampen et al. |
| 2005/0152324 | A1 | 7/2005 | Benveniste |
| 2005/0286454 | A1 | 12/2005 | Morimoto et al. |
| 2006/0029024 | A1 | 2/2006 | Zeng et al. |
| 2006/0292987 | A1 | 12/2006 | Ophir et al. |
| 2007/0077936 | A1 | 4/2007 | Tomisawa et al. |
| 2007/0082688 | A1 | 4/2007 | Tu et al. |
| 2007/0171910 | A1 | 7/2007 | Kumar |
| 2007/0183393 | A1 | 8/2007 | Boyd et al. |
| 2007/0230393 | A1 | 10/2007 | Sinha et al. |
| 2007/0248066 | A1 * | 10/2007 | Banerjea et al. ............... 370/338 |
| 2008/0069021 | A1 | 3/2008 | Chhabra |
| 2008/0095134 | A1 * | 4/2008 | Chen et al. .................... 370/342 |
| 2009/0016248 | A1 | 1/2009 | Li et al. |
| 2009/0034443 | A1 | 2/2009 | Walker et al. |
| 2009/0073945 | A1 | 3/2009 | Seok |
| 2009/0097438 | A1 | 4/2009 | Kneckt et al. |
| 2009/0196211 | A1 | 8/2009 | Wentink |
| 2009/0279467 | A1 | 11/2009 | Ji |
| 2009/0296615 | A1 | 12/2009 | Kim et al. |
| 2009/0310578 | A1 | 12/2009 | Convertino et al. |
| 2009/0312073 | A1 | 12/2009 | Park et al. |
| 2010/0061272 | A1 * | 3/2010 | Veillette ........................ 370/254 |
| 2010/0070767 | A1 | 3/2010 | Walker et al. |
| 2010/0093378 | A1 | 4/2010 | Chin et al. |
| 2010/0118797 | A1 | 5/2010 | Park et al. |
| 2010/0128701 | A1 | 5/2010 | Nagaraja |
| 2010/0153727 | A1 | 6/2010 | Reznik et al. |
| 2010/0189021 | A1 | 7/2010 | He et al. |
| 2010/0214968 | A1 | 8/2010 | Paliwal et al. |
| 2010/0246591 | A1 | 9/2010 | Gobriel et al. |
| 2010/0254290 | A1 | 10/2010 | Gong et al. |
| 2010/0284316 | A1 | 11/2010 | Sampathkumar |
| 2010/0325459 | A1 | 12/2010 | Kangude et al. |
| 2011/0051638 | A1 | 3/2011 | Jeon et al. |
| 2011/0086662 | A1 | 4/2011 | Fong et al. |
| 2011/0122835 | A1 | 5/2011 | Naito et al. |
| 2011/0158142 | A1 * | 6/2011 | Gong et al. .................... 370/311 |
| 2011/0161697 | A1 | 6/2011 | Qi et al. |
| 2011/0237294 | A1 | 9/2011 | Hussain |
| 2011/0280170 | A1 | 11/2011 | Bowser et al. |
| 2012/0021735 | A1 | 1/2012 | Maeder et al. |
| 2012/0151089 | A1 | 6/2012 | Ponmudi et al. |
| 2013/0028206 | A1 | 1/2013 | Cho et al. |
| 2013/0201936 | A1 | 8/2013 | Chen et al. |
| 2013/0204936 | A1 | 8/2013 | El Khayat et al. |
| 2013/0238919 | A1 | 9/2013 | Ponmudi et al. |
| 2013/0315121 | A1 | 11/2013 | Sampathkumar |
| 2013/0329618 | A1 | 12/2013 | Panneerselvam et al. |
| 2014/0036898 | A1 | 2/2014 | Liu |
| 2014/0237156 | A1 | 8/2014 | Regula et al. |
| 2014/0269692 | A1 | 9/2014 | Flynn et al. |
| 2015/0264646 | A1 | 9/2015 | Ponmudi et al. |

FOREIGN PATENT DOCUMENTS

| | | |
|---|---|---|
| KR | 1020140133904 | 11/2014 |
| WO | 2013134389 | 9/2013 |

OTHER PUBLICATIONS

"IEEE Standard for Information technology—Telecommunications and information exchange between systems-Local and metropolitan area networks-Specific requirements-Part 11: Wireless LAN Medium Access Control (MAC) and Physical Layer (PHY) Specifications", *IEEE Std 802.11-2007 (Revision of IEEE.Std 802.11-1999)* Section 11; http://standards.ieee.org/getieee802/download/802.11-2007.pdf. (Date Obtained from Internet Apr. 6, 2010) Jun. 12, 2007, pp. 468-517.

"IEEE Standard for Information technology—Telecommunications and information exchange between systems-Local and metropolitan area networks-Specific requirements-Part 11: Wireless LAN Medium Access Control (MAC) and Physical Layer (PHY) Specifications", *IEEE Std 802.11-2007 (Revision of IEEE.Std 802.11-1999)* Section 5; http://standards.ieee.org/getieee802/download/802.11-2007.pdf. (Date Obtained from Internet Apr. 6, 2010) Jun. 12, 2007, pp. 72-99.

Jung, Eun-Sun et al., "A Power Control MAC Protocol for Ad Hoc Networks", 2002 , 12 pages.

Co-pending U.S. Appl. No. 12/562,819, filed Sep. 18, 2009.
Co-pending U.S. Appl. No. 12/768,434, filed Apr. 27, 2010.
Co-pending U.S. Appl. No. 12/768,912, filed Apr. 28, 2010.
Co-pending U.S. Appl. No. 12/963,160, filed Dec. 8, 2010.
Co-pending U.S. Appl. No. 13/088,081, filed Apr. 15, 2011.
Co-pending U.S. Appl. No. 13/413,011, filed Mar. 6, 2012.

IEEE Standard for Information technology—Telecommunications and information exchange between systems-Local and metropolitan area networks-Specific requirements-Part 11: Wireless LAN Medium Access Control (MAC) and Physical Layer (PHY) Specifications, IEEE Std 802.11-2007 (Revision of IEEE Std 802.11-1999) http://standards.ieee.org/getieee802/download/802.11-2007.pdf. (Date Obtained from Internet Oct. 21, 2009) Jun. 12, 2007 , pp. 59-312.

"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs alljsp"amumber=5605400 Oct. 14, 2010 , 96 pages.

International Search Report and Written Opinion—PCT/US2011/062154—ISA/EPO—Mar. 6, 2012.

"U.S. Appl. No. 12/492,405 Office Action", Mar. 15, 2012, 9 pages.
"U.S. Appl. No. 12/562,819 Final Office Action", May 3, 2012 , 32 pages.
"U.S. Appl. No. 12/562,819 Office Action", Nov. 14, 2011, 26 pages.
"U.S. Appl. No. 12/705,267 Office Action", Mar. 22, 2012, 11 pages.
"U.S. Appl. No. 12/768,912 Office Action", Sep. 7, 2012 , 23 pages.
"U.S. Appl. No. 12/768,434 Office Action", Oct. 15, 2012, 11 pages.
U.S. Appl. No. 12/562,819 Office Action, Feb. 5, 2013, 29 pages.
U.S. Appl. No. 12/768,434 Final Office Action, Mar. 20, 2013, 15 pages.

(56) References Cited

OTHER PUBLICATIONS

U.S. Appl. No. 12/768,912 Final Office Action, Feb. 22, 2013, 27 Pages.
"U.S. Appl. No. 13/088,081 Non-Final Office Action", Apr. 24, 2013, 14 Pages.
"U.S. Appl. No. 12/963,160 Office Action", Apr. 16, 2013, 25 pages.
PCT Application No. PCT/US11/62154 International Preliminary Report on Patentability, Jun. 20, 2013, 8 pages.
"PCT Application No. PCT/US2013/029377 International Search Report", Jun. 17, 2013, 11 pages.
"U.S. Appl. No. 12/963,160 Final Office Action", Aug. 15, 2013, 19 pages.
"U.S. Appl. No. 12/963,160 Office Action", Jan. 6, 2014, 20 pages.
PCT Application No. PCT/US2013/029377 Written Opinion of the IPEA, 7 pages, Feb. 11, 2014.
Co-pending U.S. Appl. No. 14/049,661, filed Oct. 9, 2013, 32 pages.
"U.S. Appl. No. 12/963,160 Final Office Action", Jul. 30, 2014, 21 Pages.
"U.S. Appl. No. 13/413,011 Office Action", Jul. 30, 2014, 15 Pages.
"Peer-to-Peer Technical Group, Peer-to-Peer Technical Specification", Revision 1.0, May 12, 2009, 105 Pages.
"U.S. Appl. No. 14/049,661 Office Action", Sep. 19, 2014, 11 Pages.
"IN Application No. 1177/MUM/2009 First Examiner Report", Sep. 11, 2014, 3 pages.
U.S. Appl. No. 13/955,779 Office Action, May 13, 2015, 21 pages.
Japanese Patent Application No. 2014-561078, Office Action, Sep. 15, 2015, 6 pages.
U.S. Appl. No. 13/955,779 Final Office Action, Aug. 31, 2015, 26 pages.

\* cited by examiner

MULTICAST TRANSMISSION FOR POWER MANAGEMENT IN AN AD-HOC WIRELESS SYSTEM

BACKGROUND

Embodiments of the inventive subject matter generally relate to the field of wireless communication and, more particularly, to multicast transmissions for power management in an ad-hoc wireless system.

Wireless devices implement power saving mechanisms to conserve battery power and to reduce energy consumption. In an ad-hoc wireless local area network (WLAN), a wireless device generates unicast and/or multicast announcement traffic indication map (ATIM) frames to notify other wireless devices of pending data transfers. The ATIM frames are transmitted in an ATIM window. The wireless devices that receive the ATIM frames remain in an active power state to receive the data. The wireless devices that do not receive the unicast ATIM frames enter into a sleep mode or an inactive power state after the ATIM window ends.

SUMMARY

Various embodiments for transmitting multicast ATIM frames for power management in an ad-hoc wireless system are disclosed. In one embodiment, at a first of a plurality of wireless network devices in an ad-hoc wireless network, network identifiers associated with one or more additional wireless network devices of the plurality of wireless network devices in the ad-hoc wireless network are determined. A subset of wireless network devices from the plurality of wireless network devices that should remain in an active power state is identified. The network identifiers associated with the subset of wireless network devices that should remain in the active power state are determined. A multicast message comprising an indication of the network identifiers associated with the subset of wireless network devices that should remain in the active power state is generated. The multicast message is transmitted to the plurality of wireless network devices in the ad-hoc wireless network to cause the subset of wireless network devices to remain in the active power state.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
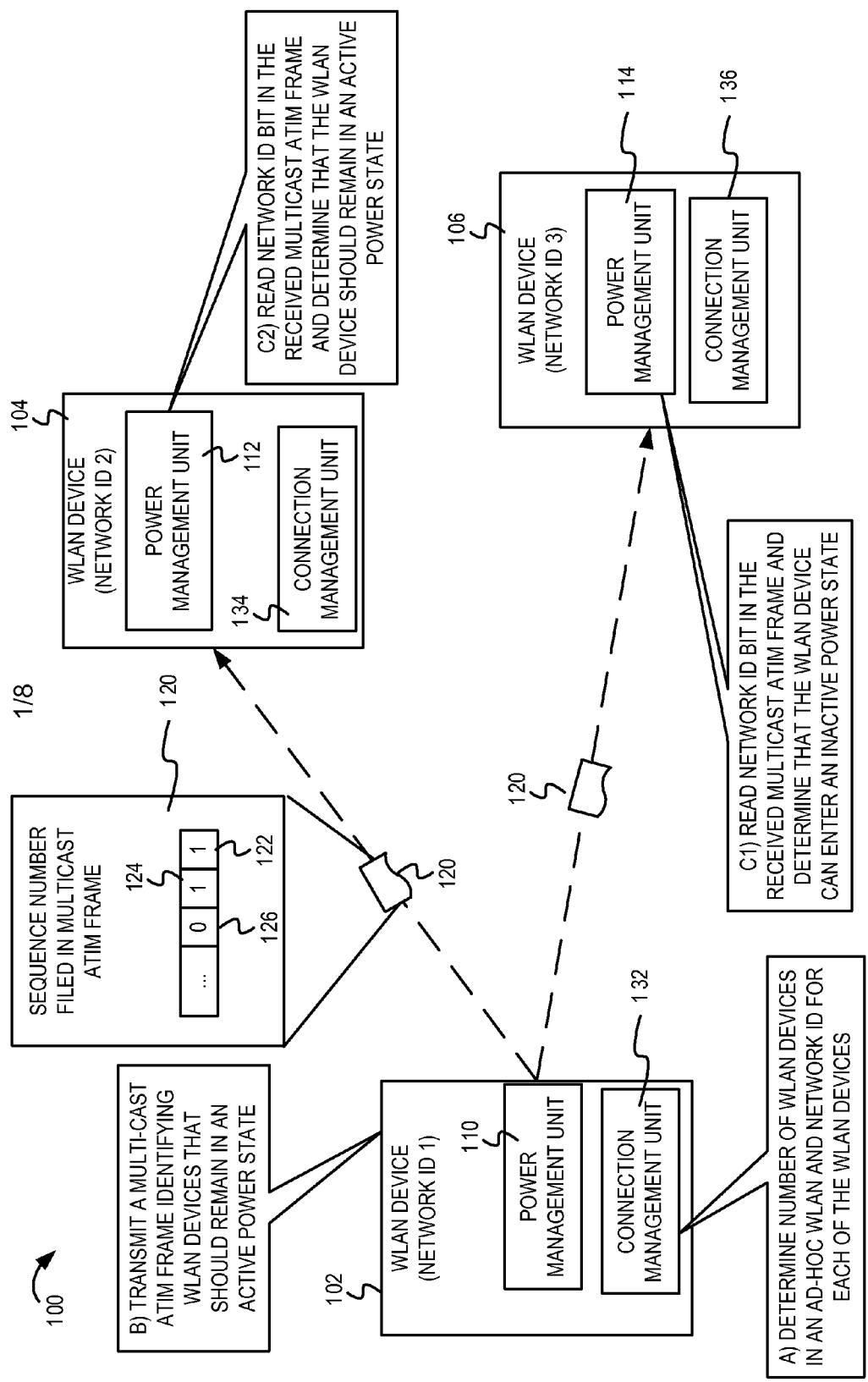
FIG. 1 is an example conceptual diagram illustrating a technique for enabling power saving in a WLAN device using a multicast ATIM frame.

The description that follows includes exemplary systems, methods, techniques, instruction sequences, and computer program products that embody techniques of the present inventive subject matter. However, it is understood that the described embodiments may be practiced without these specific details. For instance, although examples refer to a power management technique for WLAN devices in an ad-hoc wireless system, the power management technique described herein can be implemented by other standards and devices, e.g., Bluetooth®, WiMAX, ZigBee®, Wireless USB devices, etc. In other instances, well-known instruction instances, protocols, structures, and techniques have not been shown in detail in order not to obfuscate the description.

In an ad-hoc 802.11 network, a transmitting WLAN device transmits unicast or multicast ATIM frames to announce queued data frames to other WLAN devices in the network. Transmitting a multicast ATIM frame results in all WLAN devices in the ad-hoc network remaining in an active power state irrespective of whether the data meant for all the WLAN devices. A unicast ATIM frame is directed to a single WLAN device in the ad-hoc network and only the WLAN device that receives the unicast ATIM frame remains in the active power state. However, if the transmitting WLAN device wishes to transmit data to N WLAN devices in the ad-hoc network, the transmitting WLAN device transmits N unicast ATIM frames in an ATIM window and receives an acknowledgement for each of the N unicast ATIM frames. Moreover, the transmitting WLAN device retransmits the unicast ATIM frames if an acknowledgement is not received. Transmitting individual unicast ATIM frames, receiving acknowledgements, and retransmitting the unicast ATIM frames (if required) can increase transmission overhead (e.g., a number of frames transmitted). In high traffic environments (e.g., a gaming environment, audio/video conferencing environment, etc.) or in networks comprising a large number of WLAN devices, the ATIM window may not be sufficient to accommodate a large number of transmissions/retransmissions of ATIM frames/acknowledgements. This can result in data loss and connection drops which, in turn, can result in performance degradation and increase inefficiency.

Functionality can be implemented to use multicast ATIM frames to announce availability of queued data to the WLAN devices in the ad-hoc network. A single multicast frame can be used to notify one or more WLAN devices in the ad-hoc network that should remain in the active power state to receive the queued data. Instead of instructing all WLAN devices that receive the multicast ATIM frame to remain in the active power state, the transmitting WLAN device can specify in the multicast ATIM frame, which WLAN devices should remain in an active power state using a unique network identifier associated with each WLAN device. In one example, the transmitting WLAN device can identify the WLAN devices that should remain in the active power state and transmit a notification by setting the appropriate bit(s) in the multicast ATIM frame. On receiving the multicast ATIM frame, a receiving WLAN device can determine whether the bit associated with the receiving WLAN device is set. If so, the receiving WLAN device can remain in the active power state to receive the queued data. Otherwise, the receiving WLAN device can enter a sleep mode. Using a single multicast ATIM frame to notify multiple WLAN devices of whether or not to remain in the active power state can reduce the overhead associated with transmitting multiple unicast ATIM frames. This can also reduce the length of the ATIM window which, in turn, can improve power saving, improve efficiency, and improve data reliability.

FIG. 1 is an example conceptual diagram illustrating a technique for enabling power saving in a WLAN device using a multicast ATIM frame. FIG. 1 depicts a WLAN device 102, a WLAN device 104, and a WLAN device 106. The WLAN devices 102, 104, and 106 are part of an ad-hoc WLAN 100. Each WLAN device comprises a power management unit and a connection management unit. The WLAN device 102 comprises a power management unit 110 and a connection management unit 132, the WLAN device 104 comprises a power management unit 112 and a connection management unit 134, and the WLAN device 106 comprises a power management unit 114 and a connection management unit 136.

At stage A, the connection management unit 132 of the WLAN device 102 determines a number of WLAN devices in the ad-hoc WLAN 100. The connection management unit 132 also determines a network identifier for each of the WLAN devices 102, 104, and 106 in the ad-hoc WLAN 100. In one implementation, the connection management unit 132 receives beacon frames from the WLAN devices 104 and 106. The connection management unit 132 may determine the network identifier associated with the WLAN devices 104 and 106 based on reading a network identifier field in the received beacon frames. For example, the connection management unit 132 may read a network identifier field in a beacon frame received from the WLAN device 104 and determine that the network identifier associated with the WLAN device 104 is 0x2. Likewise, the connection management unit 132 may read a network identifier field in a beacon frame received from the WLAN device 106 and determine that the network identifier associated with the WLAN device 104 is 0x3. Additionally, the beacon frames may also indicate the number of WLAN devices connected in the ad-hoc WLAN 100. On determining the network identifier associated with the WLAN devices 104 and 106, the connection management unit 132 may update a connection table (not shown) to keep track of the WLAN devices in the ad-hoc WLAN 100 and their corresponding network identifiers. The connection table may comprise a list of MAC addresses (or other device identifiers) and the corresponding network identifiers associated with the WLAN devices.

At stage B, the WLAN device 102 transmits a multicast ATIM frame identifying the WLAN devices in the ad-hoc WLAN 100 that should remain in an active power state (e.g., a normal power mode, a power mode where components of the WLAN device are not in a sleep mode, etc). In one example, the connection management unit 132 may determine a list of WLAN devices that should remain in the active power state. The connection management unit 132 may access a transmit buffer to determine the list of WLAN devices for which queued data is available. The connection management unit 132 may also access the connection table to determine the network identifiers associated with the WLAN devices that should remain in the active power state. For example, in response to determining that the WLAN device 104 should remain in the active power state, the connection management unit 132 may access the connection table and determine that the network identifier associated with the WLAN device 104 is 0x2. The connection management unit 132 may then populate a sequence number field 120 in the multicast ATIM frame to indicate the network identifiers associated with the WLAN devices that should remain in the active power state. The three least significant bits of the sequence number field 120 of the multicast ATIM frame are shown in FIG. 1, according to one example. Bit 122 represents a power state (i.e., active power state or inactive power state) of the WLAN device 102 with network identifier 0x1, bit 124 represents the power mode of the WLAN device 104 with network identifier 0x2, and bit 126 represents the power mode of the WLAN device 106 with network identifier 0x3. In one example, the connection management unit 132 sets bits 122 and 124 to "1" to indicate that the WLAN devices 102 and 104 (i.e., the WLAN devices with network identifiers 0x1 and 0x2 respectively) should remain in the active power state. The connection management unit 132 sets bit 126 to "0" to indicate that the WLAN device 106 (with network identifier 0x3) need not remain in the active power state. The WLAN device 102 then transmits the multicast ATIM frame comprising the sequence number field 120 to the WLAN devices 104 and 106.

At stage C1, the power management unit 114 in the WLAN device 106 reads a network identifier bit in a received multicast ATIM frame to determine that the WLAN device 106 can enter the inactive power state (e.g., a low-powered state, a sleep mode, etc.). In one example, if the network identifier associated with the WLAN device 106 is 3, the power management unit 114 may read a third least significant bit (bit 126) in the sequence number field 120 of the received multicast ATIM frame. The power management unit 114 may determine that the bit 126 is set to "0" indicating that queued data is not available for the WLAN device 106. Accordingly, the power management unit 114 can cause the WLAN device 106 to enter the inactive power state. In one example, the power management unit 114 can transmit a signal to other processing components of the WLAN device 106 and direct the other processing components of the WLAN device 106 to suspend operations, enter a low powered power state, etc.

At stage C2, the power management unit 112 in the WLAN device 104 reads a network identifier bit in the received multicast ATIM frame and determines that the WLAN device 104 should remain in the active power state. In one example, if the network identifier associated with the WLAN device 104 is 0x2, the power management unit 112 may read a second least significant bit (bit 124) in the sequence number field 120 of the received multicast ATIM frame. The power management unit 112 may determine that the bit 124 is set to "1" indicating that queued data is available for the WLAN device 104. Accordingly, the power management unit 112 can cause the WLAN device 104 to remain in the active power state to receive the queued data from the WLAN device 102.

Figure 2:
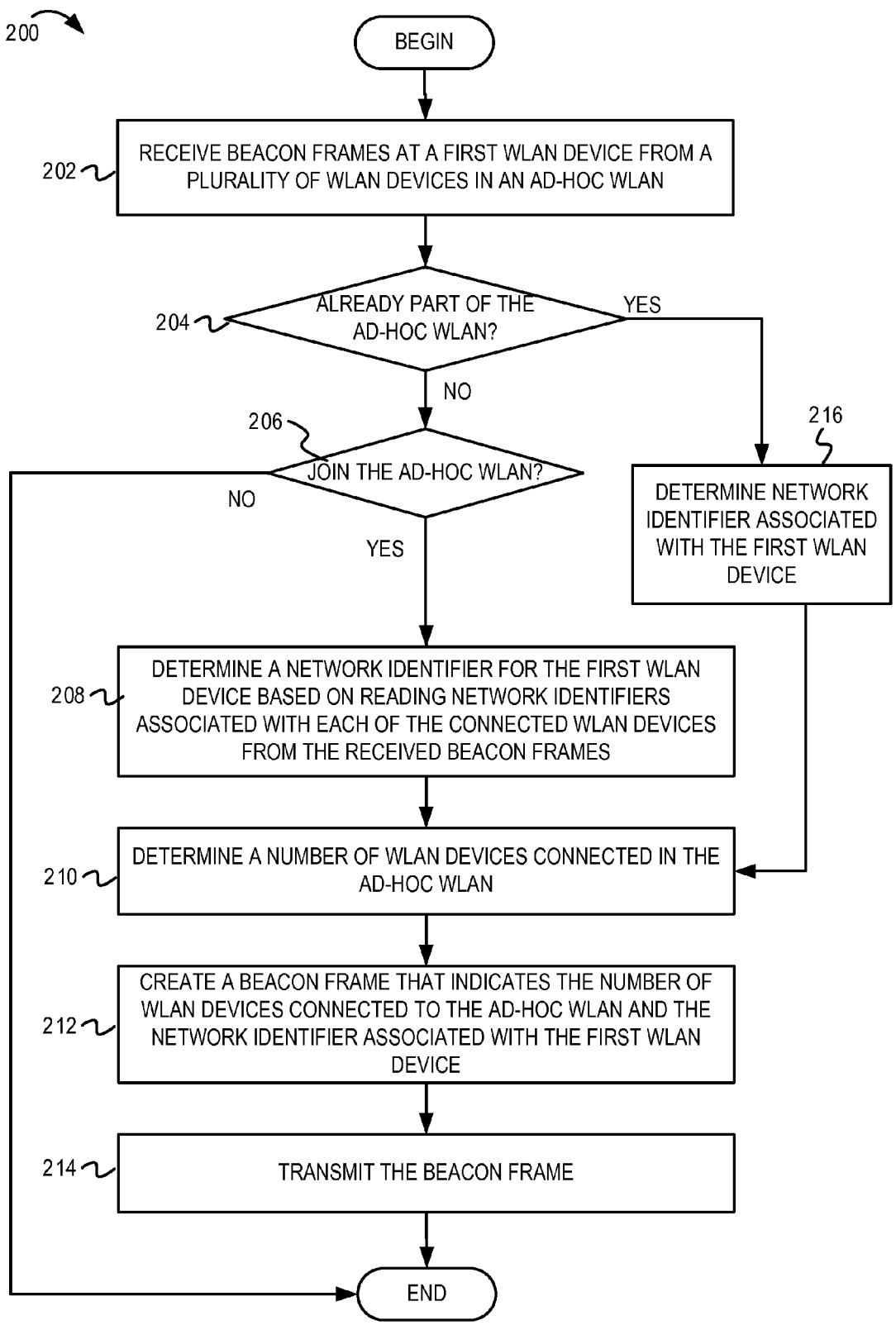
FIG. 2 is a flow diagram illustrating example operations for identifying WLAN devices in an ad-hoc WLAN.

FIG. 2 is a flow diagram ("flow") 200 illustrating example operations for identifying WLAN devices in an ad-hoc WLAN. The flow 200 begins at block 202.

Figure 4A:
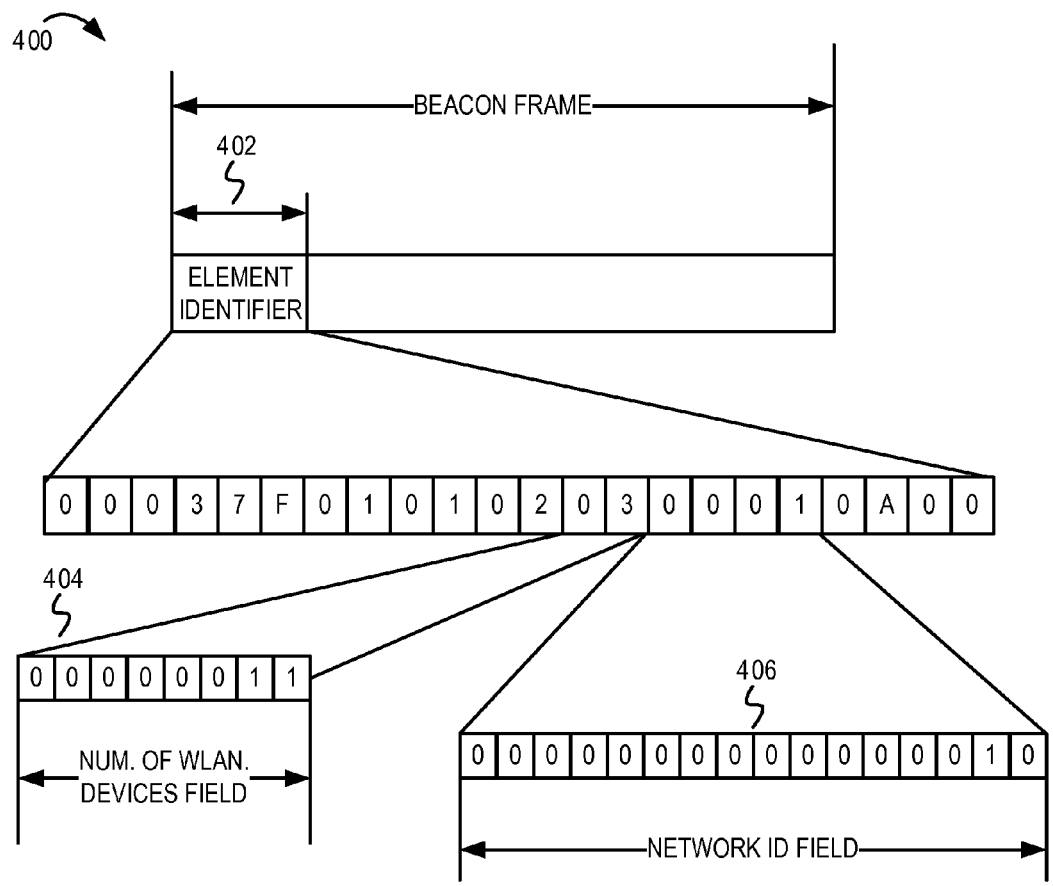
FIG. 4A illustrates an example format of a beacon frame transmitted by a WLAN device.

At block 202, beacon frames are received at a first WLAN device from a plurality of WLAN devices in an ad-hoc WLAN. For example, in FIG. 1, the WLAN device 102 receives the beacon frames from the WLAN devices 104 and 106 in the ad-hoc WLAN 100. Each beacon frame indicates a network identifier associated with the WLAN device that transmitted the beacon frame and a number of WLAN devices in the ad-hoc WLAN 100. For example, the beacon frame transmitted by the WLAN device 104 indicates the network identifier associated with the WLAN device 104 and the number of WLAN devices in the ad-hoc WLAN 100. In one implementation, each WLAN device in the ad-hoc WLAN 100 may determine and broadcast the number of WLAN devices in the ad-hoc WLAN and the unique network identifier in an element identifier field of the beacon frame. In one example, the number of WLAN devices in the ad-hoc WLAN 100 may be determined based on the number of beacon frames received. FIG. 4A illustrates an example format of a beacon frame 400 transmitted by each WLAN device in the ad-hoc WLAN 100 (e.g., the WLAN device 104). As illustrated, the beacon frame 400 comprises an element identifier field 402. The element identifier field 402 comprises a number of WLAN devices field 404 and a network identifier field 406. In one implementation, the number of WLAN devices field 404 may be a one-byte field, while the network identifier field 406 may be a two-byte field. As depicted in FIG. 4A, in one example, the WLAN device 104 may set the number of WLAN devices field 404 to 0x3 to indicate that the ad-hoc WLAN 100 comprises a total of three WLAN devices (i.e., the WLAN devices 102, 104, and 106). The WLAN device 104 may set the second LSB in the network identifier field 406 to indicate that the network identifier associated with the WLAN device 104 is 0x2. The WLAN device 102 may receive the beacon frame 400 from the WLAN device 104, and may determine that the network identifier associated with the WLAN device 104 is 0x2 based on determining that the second LSB of the network identifier field 406 is set. It should be noted that in other implementations, any suitable number of bytes could be used to indicate the number of connected WLAN devices and to indicate the network identifier. Referring back to FIG. 2, the flow continues at block 204.

At block 204, it is determined whether the first WLAN device is already part of the ad-hoc WLAN. For example, the connection management unit 132 in the WLAN device 102 may determine whether the WLAN device 102 is part of the ad-hoc WLAN 100. In some implementations, the connection management unit 132 may access a connection structure to determine whether the WLAN device 102 is connected to the ad-hoc WLAN 100. If it is determined that the first WLAN device is already part of the ad-hoc WLAN, the flow continues at block 216. Otherwise, the flow continues at block 206.

At block 206, it is determined whether the first WLAN device should join the ad-hoc WLAN. For example, the connection management unit 132 may determine whether the WLAN device 102 should join the ad-hoc WLAN 100. The connection management unit 132 may determine whether to join the ad-hoc WLAN 100 based on determining whether the WLAN device 102 is programmed to communicate with the WLAN devices 104 and 106 in the ad-hoc WLAN 100. For example, the connection management unit 132 may determine that the WLAN device 102 is programmed to communicate with the WLAN device 106 in the ad-hoc WLAN 100 and may therefore determine that the WLAN device 102 should join the ad-hoc WLAN 100. The connection management unit 132 may also determine whether it is possible for the WLAN device 102 to join the ad-hoc WLAN 100. In some implementations, the number of WLAN devices that can join the ad-hoc WLAN may be restricted. For example, the ad-hoc WLAN 100 may be restricted to sixteen WLAN devices. In this example, if the connection management unit 132 determines that the ad-hoc WLAN 100 already includes sixteen WLAN devices, the connection management unit 132 will determine that the WLAN device 102 cannot join the ad-hoc WLAN 100. In other words, the connection management unit 132 may determine whether the number of WLAN devices in the ad-hoc WLAN 100 is equal to a maximum allowable number of WLAN devices, and may consequently determine whether the WLAN device 102 can join the ad-hoc WLAN 100. If it is determined that the first WLAN device can join the ad-hoc WLAN, the flow continues at block 208. Otherwise, the flow ends.

At block 208, after determining that the first WLAN device can join the ad-hoc WLAN, a network identifier is determined for the first WLAN device based on reading the network identifier associated with each of the connected WLAN devices from the received beacon frames. The first WLAN device that wishes to join the ad-hoc WLAN 100 can determine its unique network identifier based on knowledge of the network identifier associated with the other WLAN devices in the ad-hoc WLAN 100, and based on knowledge of the number of WLAN devices connected in the ad-hoc WLAN 100. For example, the connection management unit 132 may read the network identifier field 406 in each of the beacon frames 400 received from the other WLAN devices in the ad-hoc WLAN 100. The network identifier field 406 may be a unique identifier that identifies a WLAN device for the duration that the WLAN device is connected to the ad-hoc WLAN 100. For example, as illustrated in FIG. 1, the network identifier associated with the WLAN device 104 is 0x2, the network identifier associated with the WLAN device 106 is 0x3, etc. If the WLAN device 104 leaves the ad-hoc WLAN 100 and joins a second ad-hoc WLAN, the WLAN device 104 may be assigned a different network identifier (e.g., network identifier 0xF) based on availability of network identifiers in the second ad-hoc WLAN. The connection management unit 132 may also determine a set of available network identifiers for the WLAN device 102. For example, if the maximum allowable number of WLAN devices in the ad-hoc WLAN is 16 and network identifiers 0x2 and 0x3 are already associated with WLAN devices, the connection management unit 132 can determine that the network identifiers 0x0-0x1 and 0x4-0xF are available. The connection management unit 132 may select a network identifier for the WLAN device 102 from the set of available network identifiers. In one implementation, the connection management unit 132 may select and assign the lowest network identifier, from the set of available network identifiers, to the WLAN device 102. In another implementation, the connection management unit 132 may randomly select the network identifier, from the set of available network identifiers, for the WLAN device 102. As illustrated in FIG. 1, in one example, after determining that the network identifier "0x1" is available, the connection management unit 132 can associate the network identifier "0x1" with the WLAN device 102. It should be noted that network identifiers may not be reserved for a specific WLAN device. Instead, the WLAN device is assigned any available network identifier. The flow continues at block 210.

At block 210, a number of WLAN devices connected in the ad-hoc WLAN is determined. For example, the connection management unit 132 determines the number of WLAN devices in the ad-hoc WLAN 100 after the WLAN device 102 joins the ad-hoc WLAN 100. In one implementation, the connection management unit 132 may determine the number of connected WLAN devices based on the number of received beacon frames. For example, if the connection management unit 132 receives five beacon frames from five distinct WLAN devices, the connection management unit 132 may determine that the ad-hoc WLAN comprises five additional WLAN devices. In another implementation, the connection management unit 132 may determine the number of connected WLAN devices based on reading the number of WLAN devices field 404 in the received beacon frames. The flow continues at block 212.

At block 212, a beacon frame that indicates the number of WLAN devices connected to the ad-hoc WLAN and the network identifier associated with the first WLAN device is created. For example, the connection management unit 132 creates the beacon frame for the WLAN device 102. The connection management unit 132 may set the first least significant bit (LSB) in the network identifier field 406 in the beacon frame 400 to 1 to indicate that the network identifier associated with the WLAN device 102 is 0x1. The connection management unit 132 may also set the number of WLAN devices field 404 in the beacon frame 400 to 00000011 to indicate that three WLAN devices (i.e., the WLAN devices 102, 104, and 106) are connected to the ad-hoc WLAN 100. The flow continues at block 214.

At block 214, the beacon frame is transmitted. For example, the WLAN device 102 transmits the beacon frame. The WLAN devices 104 and 106 in the ad-hoc WLAN 100 receive the beacon frame. Other WLAN devices in the vicinity of the ad-hoc WLAN 100 that are not in the ad-hoc WLAN 100 but that may be interested in joining the network may also receive the beacon frame. The WLAN devices 104 and 106 can read the network identifier field 406 in the beacon frame transmitted by the WLAN device 102 to determine the network identifier associated with the WLAN device 102. From block 214, the flow ends.

At block 216, the network identifier associated with the first WLAN device is determined. For example, the connection management unit 132 determines the network identifier associated with the WLAN device 102. The flow 200 moves from block 204 to block 216 if the connection management unit 132 determines that the WLAN device 102 is already part of the ad-hoc WLAN 100. The connection management unit 132 can access a connected devices table to determine the network identifier assigned to the WLAN device 102. The flow continues at block 210, where the connection management unit 132 determines the number of WLAN devices connected in the ad-hoc WLAN 100. The flow ends after the WLAN device 102 transmits a beacon frame that indicates the network identifier associated with the WLAN device 102 and the number of connected WLAN devices. The other WLAN devices in the ad-hoc WLAN 100 can receive the beacon frame transmitted by the first WLAN device and can update (if required) their respective connected devices tables.

Figure 3:
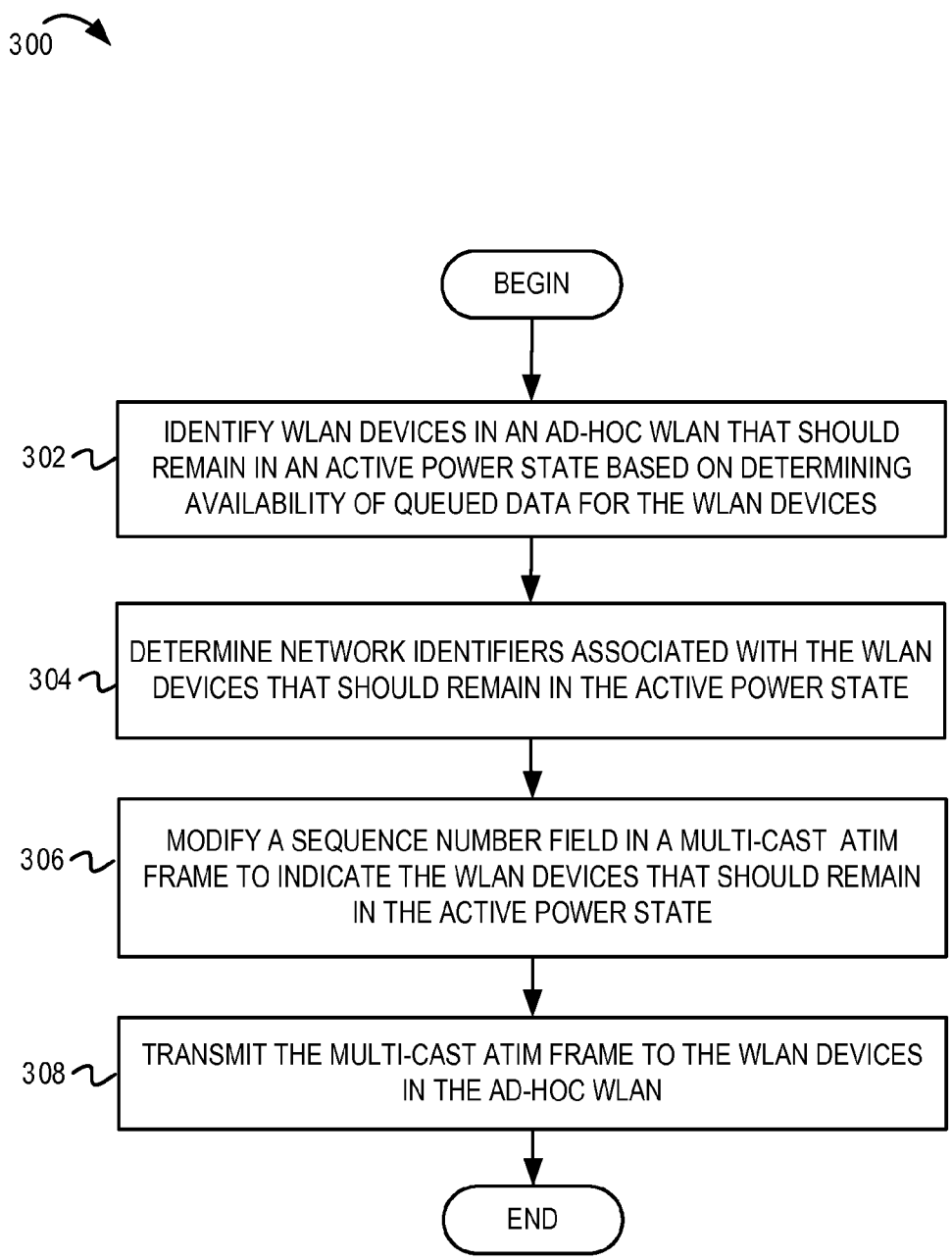
FIG. 3 is a flow diagram illustrating example operations for announcing availability of queued data to WLAN devices in an ad-hoc WLAN.

FIG. 3 is a flow diagram 300 illustrating example operations for announcing availability of queued data to WLAN devices in an ad-hoc WLAN. Flow 300 begins at block 302.

At block 302, WLAN devices in an ad-hoc WLAN that should remain in an active power state are identified based on determining availability of queued data for the WLAN devices. For example, the connection management unit 132 in the WLAN device 102 may determine the WLAN devices of the ad-hoc WLAN 100 for which the queued data is available. The connection management unit 132 may access a transmit data buffer to determine whether the queued data is available for each of the WLAN devices 104 and 106 in the ad-hoc WLAN 100. Referring to the example of FIG. 1, the connection management unit 132 determines that queued data is available for the WLAN device 104 and that queued data is not available for the WLAN device 106. The flow continues at block 304.

At block 304, network identifiers associated with the WLAN devices that should remain in the active power state are determined. For example, the connection management unit 132 can determine the network identifiers for WLAN devices for which the WLAN device 102 has queued data. In one embodiment, the connection management unit 132 may determine a MAC address (or other device identifier) of the WLAN devices that should remain in the active power state. Based on the MAC address, the connection management unit 132 may also determine the network identifiers associated with the WLAN devices that should remain in the active power state.

The connection management unit 132 may maintain a connected devices table that comprises a list of network identifiers and MAC identifiers (or other device identifiers) of the WLAN devices 104 and 106 in the ad-hoc WLAN 100. In one example, the connection management unit 132 may use the MAC address and/or the network identifier to uniquely identify the WLAN device that should remain in the active power state. The connection management unit 132 may also update the connected devices table whenever a new WLAN device joins the ad-hoc WLAN 100 or a WLAN device leave the ad-hoc WLAN 100. The connection management unit 132 may access the connected devices table to determine the network identifier associated with the WLAN devices that should remain in the active power state. For example, in response to determining that the WLAN device 104 should remain in the active power state, the connection management unit 132 may determine that the network identifier associated with the WLAN device 104 is 02. The flow continues at block 306.

Figure 4B:
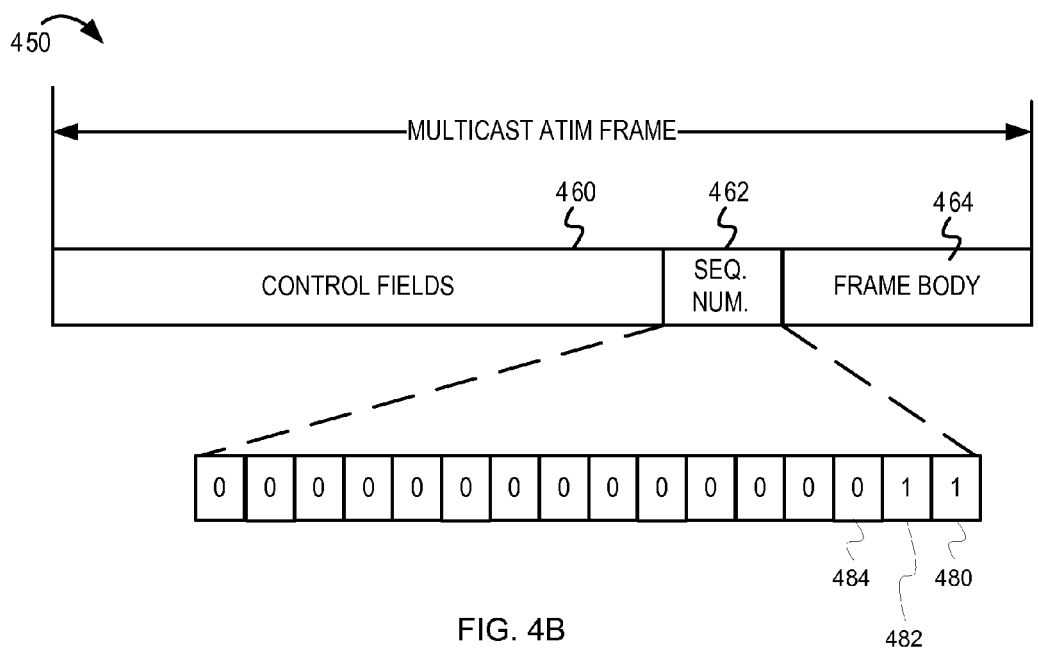
FIG. 4B is an example format of the multicast ATIM frame.

At block 306, a sequence number field in a multicast ATIM frame is modified to indicate the WLAN devices that should remain in the active power state. For example, the connection management unit 132 populates the sequence number field 120 in the multicast ATIM frame. In one implementation, the sequence number field may be a 16-bit field in a header of the multicast ATIM frame. In another implementation, the sequence number field may comprise any suitable number of bits that may be determined based on a maximum allowable number of WLAN devices in the ad-hoc WLAN. FIG. 4B is an example format of the multicast ATIM frame 450. The multicast ATIM frame 450 comprises control fields 460 (e.g., a frame control field, address fields, etc.), a sequence number field 462, and a frame body 464. It also should be noted that, in other embodiments, the multicast ATIM frame 450 could comprise one or more other fields, with other suitable number of bytes. In the multicast ATIM frame 450, the sequence number field 462 is a two-byte (i.e., 16-bit) field. Each bit in the sequence number field 462 represents a WLAN device in the ad-hoc WLAN. In other words, with a 16-bit sequence control field 462, the number of WLAN devices in the ad-hoc WLAN 100 that can be represented by the sequence control field 462 is restricted to 16. As mentioned earlier, in other implementations, the ad-hoc WLAN 100 can comprise other suitable number of WLAN devices, and consequently, the multicast ATIM frame can be modified to accommodate the maximum number of WLAN devices in the ad-hoc WLAN. As depicted in FIG. 4B, the connection management unit 132 sets bits 480 and 482 (i.e., LSB bits 1 and 2) to "1" to indicate that the WLAN devices 102 and 104 with network identifiers 0x1 and 0x2, respectively, should remain in the active power state. Also, the connection management unit 132 sets bit 484 (i.e., LSB bits 3) to "0" to indicate that the WLAN device 106 with network identifier 0x3 need not remain in the active power state. The flow continues at block 308.

At block 308, the multicast ATIM frame is transmitted to the WLAN devices in the ad-hoc WLAN. For example, the WLAN device 102 transmits the multicast ATIM frame. The WLAN devices 104 and 106 in the ad-hoc WLAN 100 listen in an ATIM window of the beacon interval for ATIM frames. The WLAN devices 104 and 106 receive the multicast ATIM frame, read a network field bit in the sequence number field that corresponds to their network identifier, and determine whether or not to remain in the active power state, as will be described in FIG. 5. From block 308, the flow ends.

Figure 5:
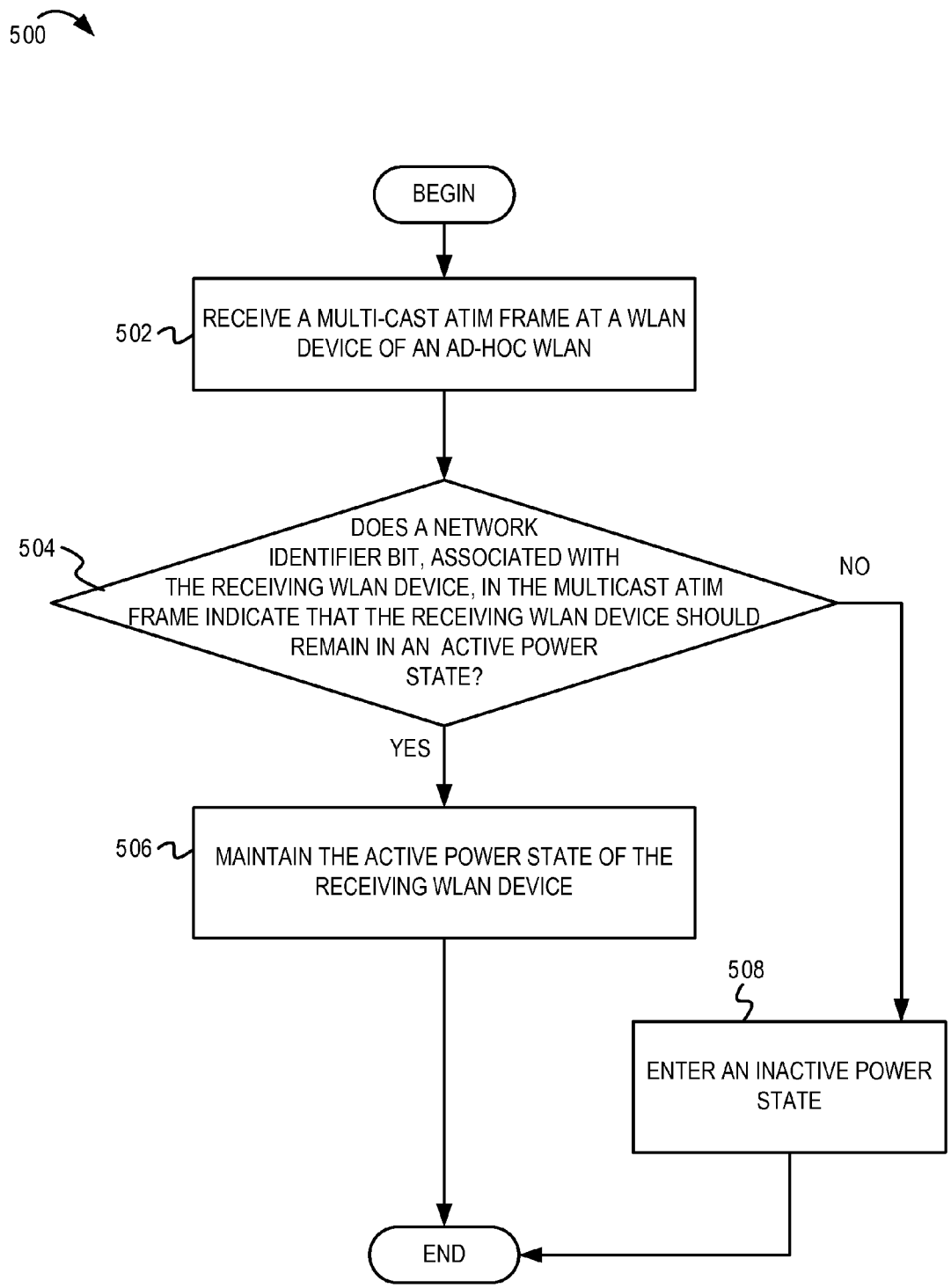
FIG. 5 is a flow diagram illustrating example operations of a WLAN device determining whether it should remain in an active power state based on a received multicast ATIM frame.

FIG. 5 is a flow diagram 500 illustrating example operations of a WLAN device determining whether it should remain in an active power state based on a received multicast ATIM frame. Flow 500 begins at block 502.

At block 502, a multicast ATIM frame is received at a WLAN device of an ad-hoc WLAN. All WLAN devices in the ad-hoc WLAN receive the multicast ATIM frame. In the example of FIG. 1, the WLAN devices 104 and 106 in the ad-hoc WLAN 100 receive the multicast ATIM frame transmitted by the WLAN device 102. For example, the power management unit 112 in the WLAN device 104 receives the multicast ATIM frame. Likewise, the power management unit 114 in the WLAN device 106 receives the multicast ATIM frame transmitted by the WLAN device 102. The flow continues at block 504.

At block 504, it is determined whether a network identifier bit, associated with the receiving WLAN device, in the multicast ATIM frame indicates that the receiving WLAN device should remain in an active power state. As depicted in FIG. 4B, each bit in a sequence number field 462 in the multicast ATIM frame 450 is uniquely (for the ad-hoc WLAN) associated with a WLAN device in the ad-hoc WLAN. For example, bit 482 (i.e., a second LSB bit) in the sequence number field 462 may be associated with the WLAN device 104 with network identifier 0x2. The power management unit 112 can read the corresponding network identifier bit 482 and determine whether the bit 482 is set to "1". In some implementations, the network identifier bit being set to "1" can indicate that queued data is available for the WLAN device associated with the network identifier bit and that the WLAN device should remain in the active power state. As another example, bit 484 (i.e., a third LSB bit) in the sequence number field 462 may be associated with the WLAN device 106 with network identifier 0x3. The power management unit 114 in the WLAN device 106 can read the corresponding network identifier bit 484 and determine whether the bit 484 is set to "1". If it is determined that the network identifier bit, in the multicast ATIM frame, associated with the receiving WLAN device indicates that the receiving WLAN device should remain in the active power state, the flow continues at block 506. Otherwise, the flow continues at block 508.

At block 506, the receiving WLAN device remains in the active power state. For example, in response to determining that the network identifier bit 482 is set to 1, the power management unit 112 may prevent the WLAN device 104 from entering the inactive power state. In some implementations, the power management unit 112 may not transmit a signal to various processing components of the WLAN device 104 to direct the processing components to enter the inactive power state. From block 506, the flow ends.

At block 508, the receiving WLAN device enters the inactive power state. The flow 500 moves from block 504 to block 508 on determining that the network identifier bit, in the multicast ATIM frame, associated with the receiving WLAN device does not indicate that the device should remain in the active power state. For example, the power management unit 114 can read the corresponding network identifier bit 484 (LSB bit 3 in the sequence number field 462), determine that the bit 484 is set to 0, and determine that the WLAN device 106 can enter the inactive power state. In one implementation, the power management unit 114 may transmit a signal to various processing components of the WLAN device 106 to direct the processing components to enter the inactive power state. From block 510, the flow ends.

Figure 6:
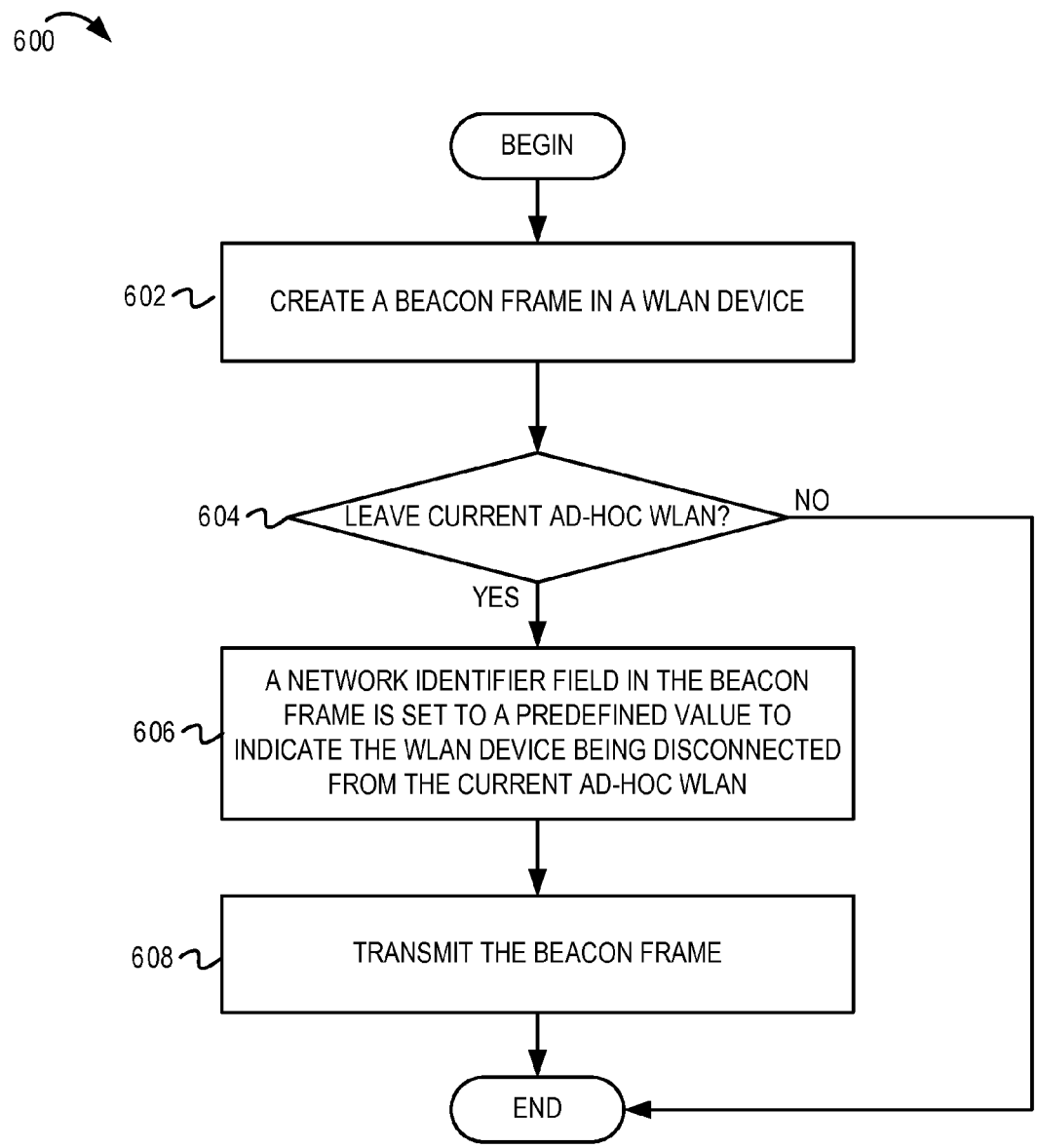
FIG. 6 is a flow diagram illustrating example operations of a WLAN device leaving an ad-hoc WLAN.

FIG. 6 is a flow diagram 600 illustrating example operations of a WLAN device leaving an ad-hoc WLAN. Flow 600 begins at block 602.

At block 602, a beacon frame is created in a WLAN device. For example, the connection management unit 132 in the WLAN device 102 of FIG. 1 creates the beacon frame. The connection management unit 132 may periodically create and transmit the beacon frame (e.g., transmit the beacon frame every predefined time interval, transmit the beacon frame every beacon interval, etc). The flow continues at block 604.

At block 604, it is determined whether the WLAN device should leave a current ad-hoc WLAN. For example, the connection management unit 132 determines whether the WLAN device 102 should leave the ad-hoc WLAN 100. The connection management unit 132 may determines that the WLAN device 102 should leave the ad-hoc WLAN 100 in response to receiving a user request for disconnecting the WLAN device 102 from the ad-hoc WLAN 100. Other factors such as low battery, weak signal strength, etc. may also contribute to the connection management unit 132 determining that the WLAN device 102 should leave the ad-hoc WLAN 100. If it is determined that the WLAN device 102 should leave the ad-hoc WLAN 100, the flow continues at block 606. Otherwise, the flow ends. It should be noted that, in some implementations, on determining that the WLAN device 102 should not leave the ad-hoc WLAN 100, the WLAN device 102 may transmit the beacon frame (indicating a network identifier associated with the WLAN device, etc.) to maintain connectivity to other WLAN devices in the ad-hoc WLAN 100.

At block 606, a network identifier field is set to a predefined value in the beacon frame to indicate that the WLAN device is disconnected from the ad-hoc WLAN. For example, the connection management unit 132 can reset the network identifier field (e.g., set the network identifier field to 0) to indicate that the WLAN device is disconnected from the ad-hoc WLAN. Resetting the network identifier field can also indicate that the WLAN device 102 will be switched off (e.g., beginning at a next beacon interval, etc). The flow continues at block 608.

At block 608, the beacon frame is transmitted. For example, the WLAN device 104 transmits the beacon frame. The WLAN devices 104 and 106 in the ad-hoc WLAN 100 receive the beacon frame, determine that the WLAN device 102 has disconnected from the ad-hoc WLAN 100, and accordingly update a connected devices list as described in FIG. 7. From block 608, the flow ends.

Figure 7:
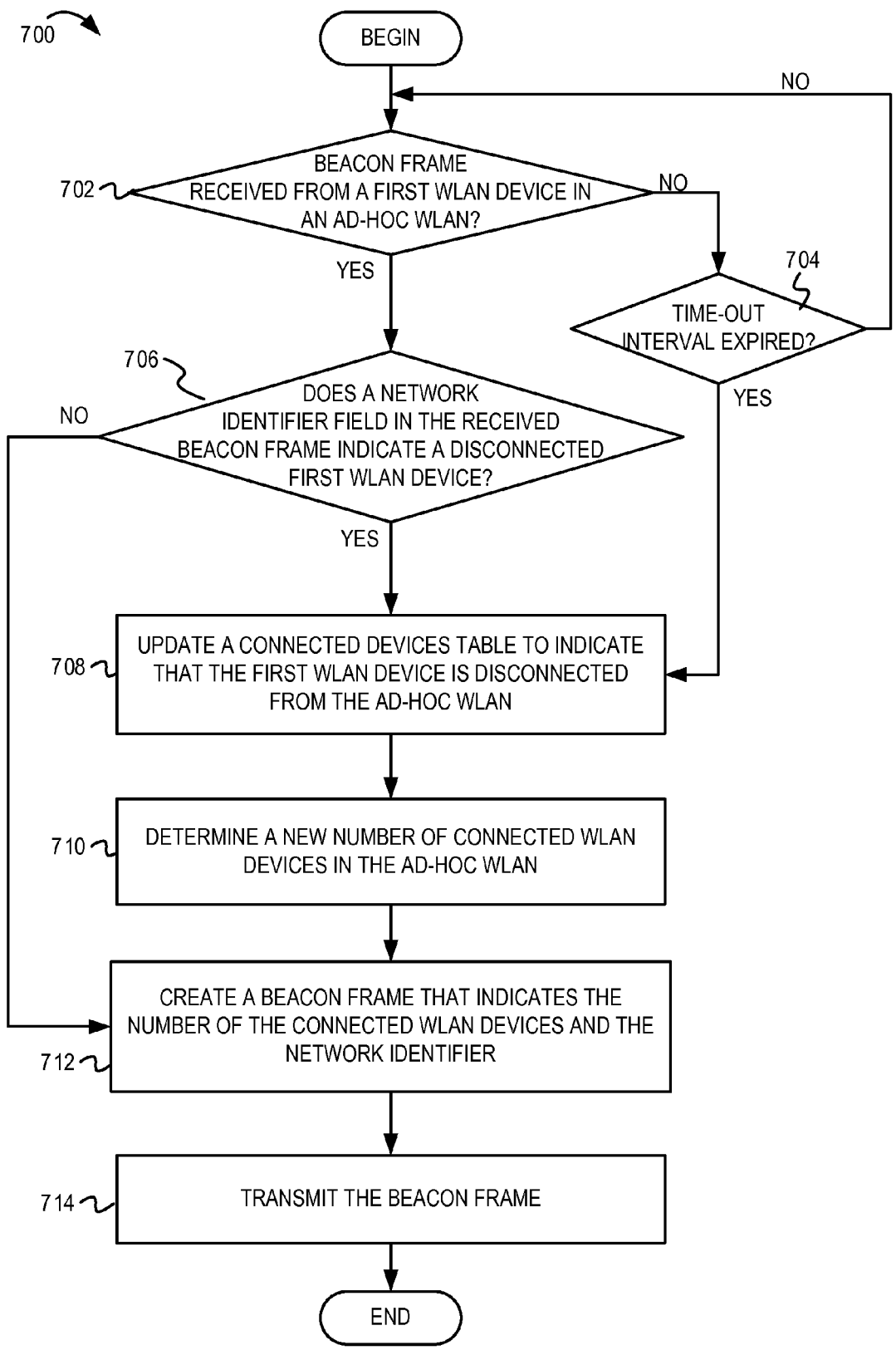
FIG. 7 is a flow diagram illustrating example operations of a WLAN device updating a list of connected WLAN devices in an ad-hoc WLAN.

FIG. 7 is a flow diagram 700 illustrating example operations of a WLAN device updating a list of connected WLAN devices in an ad-hoc WLAN. Flow 700 begins at block 702.

At block 702, a WLAN device determines whether a beacon frame has been received from a first WLAN device in an ad-hoc WLAN. For example, the connection management unit 134 in the WLAN device 104 may determine whether a beacon frame has been received from the WLAN device 102. It is noted that although the flow 700 describes the WLAN device 104 determining whether the beacon frame is received from the WLAN device 102, the WLAN device 104 performs similar operations for all the WLAN devices in the ad-hoc network 100. For example, in addition to determining whether the WLAN device 104 has received the beacon frame from the WLAN device 102, the WLAN device 104 may also determine whether a beacon frame was received from the WLAN device 106. If the receiving WLAN device determines that the beacon frame has been received from the first WLAN device, the flow continues at block 706. Otherwise, the flow continues at block 704.

At block 704, the receiving WLAN device determines whether a time-out interval is expired. For example, the connection management unit 134 determines whether the time-out interval has expired. The time-out interval may be a maximum time interval during which beacon frames from all WLAN devices in the ad-hoc WLAN 100 should be received. In one embodiment, the connection management unit 134 may reset the time-out interval on receiving the beacon frames from all the WLAN devices 102 and 106 in the ad-hoc WLAN 100. In one embodiment, the time-out interval may be proportional to a beacon interval of the WLAN devices in the ad-hoc WLAN 100 and a number of WLAN devices connected in the ad-hoc WLAN 100. If the receiving WLAN device determines that the time-out interval has expired, the flow continues at block 708. Otherwise, the flow loops back to block 702, where the receiving WLAN device waits to receive the beacon frame from the first WLAN device (and also the beacon frames from the other WLAN devices of the ad-hoc WLAN 100).

At block 706, the receiving WLAN device determines whether the network identifier field in the received beacon frame associated with the first WLAN device indicates that the first WLAN device is disconnected. The flow 700 moves from block 702 to block 706 if the receiving WLAN device receives the beacon frame from the first WLAN device. For example, the connection management unit 134 can determine whether the network identifier field in the received beacon frame indicates that the WLAN device 102 is disconnected from the ad-hoc WLAN, is switched off, etc. The connection management unit 134 can read the network identifier field in the received beacon frame and determine whether the value in the network identifier field is 0. The value in the network identifier field being equal to 0 can indicate that the WLAN device 102 (i.e., the WLAN device that transmitted the beacon frame) is switched off and/or is disconnected from the ad-hoc WLAN 100. Alternately, the value in the network identifier field being greater than 0 can indicate that the WLAN device 102 is still connected in the ad-hoc WLAN 100. If it is determined that network identifier field in the beacon frame indicates that the first WLAN device is disconnected from the ad-hoc WLAN, the flow continues at block 708. Otherwise, the flow continues at block 712.

At block 708, the connected devices table maintained in the receiving WLAN device is updated to indicate that the first WLAN device is disconnected from the ad-hoc WLAN. The flow 700 moves from block 706 to block 708 if the receiving WLAN device determines that the network identifier field in the received beacon frame indicates the first WLAN device is disconnected from the ad-hoc WLAN. For example, the connection management unit 134 may determine that the network identifier field in the beacon frame received from the WLAN 102 is set to 0x0. Consequently, the connection management unit 134 may remove an indication of the WLAN device 102 from the connected devices table maintained by the connection management unit 134. The flow 700 also moves from block 704 to block 708 if the receiving WLAN device determines that the time-out interval for receiving the beacon frame from the first WLAN device is expired. For example, after the time-out interval expires, the connection management unit 134 may determine that the WLAN device 102 has not transmitted the beacon frame and may assume that the WLAN device 102 has been disconnected or dropped from the ad-hoc WLAN 100. Consequently, the connection management unit 134 may remove the indication of the WLAN device 102 from the connected devices table. The flow continues at block 710.

At block 710, a new number of connected WLAN devices in the ad-hoc WLAN is determined. For example, the connection management unit 134 determines the new number of connected WLAN devices in the ad-hoc WLAN 100. In one implementation, the connection management unit 134 may determine the new number of connected WLAN devices based on the number of received beacon frames. The flow continues at block 712.

At block 712, the receiving WLAN device creates a beacon frame that indicates the number of connected WLAN devices and the network identifier associated with the receiving WLAN device. For example, the connection management unit 134 creates the beacon frame. The connection management unit 132 may determine the network identifier associated with the WLAN device 104 (e.g., network identifier 0x2) and accordingly update the network identifier field (e.g., the network identifier field 406 in the beacon frame 400 of FIG. 4A) to 0x2. The connection management unit 134 may also update the number of WLAN devices field 404 to indicate the number of WLAN devices connected to the receiving WLAN device in the ad-hoc WLAN 100. The flow continues at block 714.

At block 714, the beacon frame is transmitted. For example, the WLAN device 104 transmits the beacon frame. The beacon frame is received by the WLAN devices in the ad-hoc WLAN 100 and also by other WLAN devices in the vicinity of the ad-hoc WLAN 100 that may not be in the ad-hoc WLAN 100. The other WLAN devices can read the network identifier field 406 in the received beacon frame to determine the network identifier associated with the WLAN device 104 and to also determine the number of connected WLAN devices in the ad-hoc WLAN. From block 714, the flow ends.

It should be understood that the depicted diagrams (FIGS. 1 through 4) are examples meant to aid in understanding embodiments and should not be used to limit embodiments or limit scope of the claims. Embodiments may perform additional operations, fewer operations, operations in a different order, operations in parallel, and some operations differently. For instance, it should be noted that although FIGS. 1-7 describe a WLAN device using a beacon frame to notify other WLAN devices of the network identifier associated with the WLAN device, other management frames (e.g., probe request, response frames, etc.) may also be used to broadcast the network identifier associated with the WLAN device.

It should be noted that, in some implementations, prior to determining whether the network identifier bit of the received ATIM frame indicates the active power state (block 504 in FIG. 5), the receiving WLAN device may determine whether the sequence number field in the multicast ATIM frame is greater than zero. For example, the power management unit 112 in the WLAN device 102 may read the sequence number field 462 (in FIG. 4B) and determine whether the sequence number field 462 in the multicast ATIM frame 450 is greater than zero. The sequence number field 462 being greater than zero can indicate that at least one WLAN device in the ad-hoc WLAN 100 will remain in an active power state. If the sequence number field 462 is greater than zero, the power management unit 112 may read the network identifier bit corresponding to the receiving WLAN device 102 to determine whether or not the WLAN device 102 should remain in the active power state.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
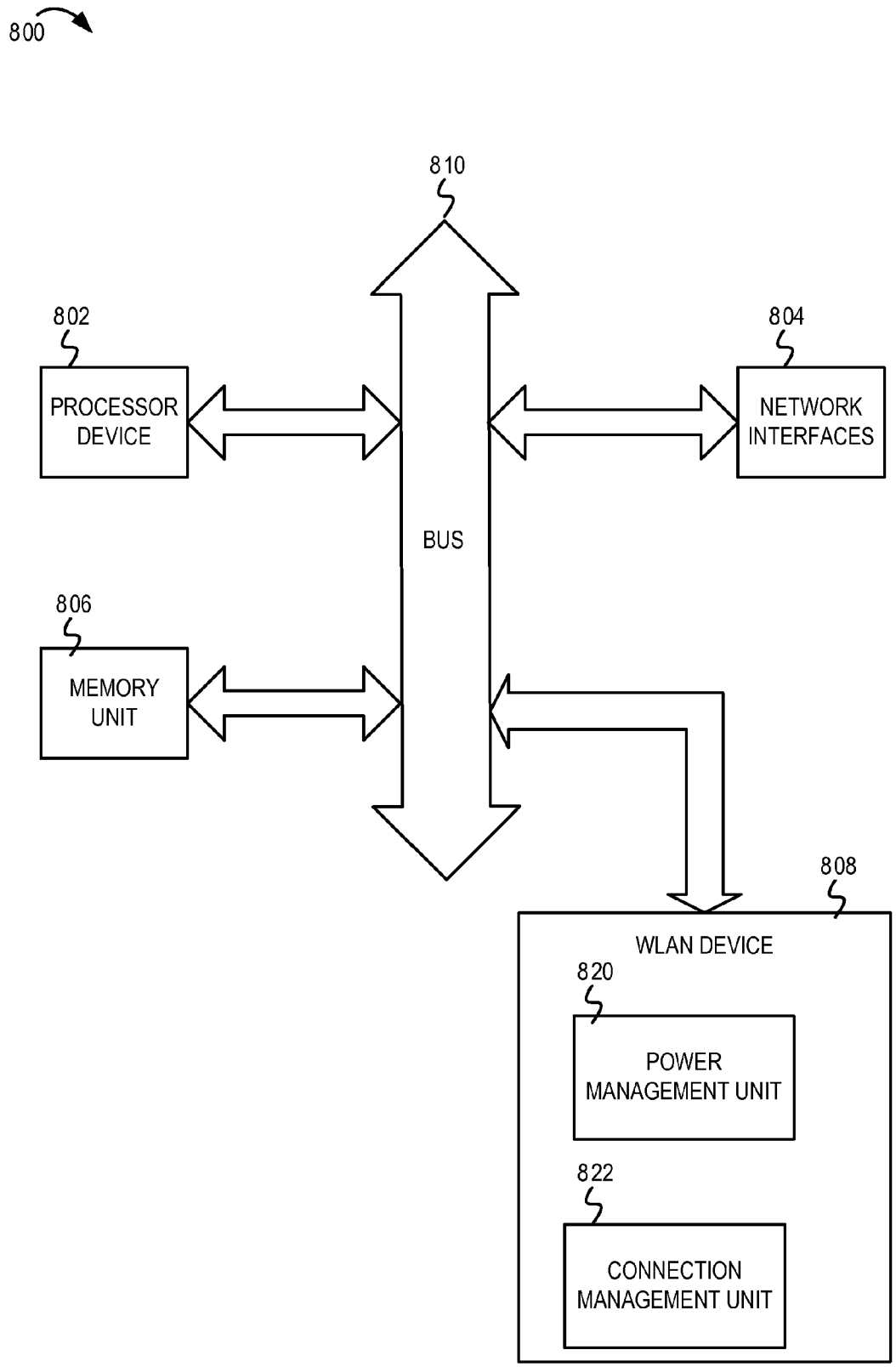
FIG. 8 is a block diagram of one embodiment of an electronic device including a mechanism for transmitting multicast ATIM frames for power management in an ad-hoc WLAN.

FIG. 8 is a block diagram of one embodiment of an electronic device 800 including a mechanism for transmitting multicast ATIM frames for power management in an ad-hoc WLAN. In some implementations, the electronic device 800 may be one of a personal computer (PC), a laptop, a netbook, a mobile phone, a personal digital assistant (PDA), or other electronic systems comprising a WLAN device 808. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 800 also includes a bus 810 (e.g., PCI, ISA, PCI-Express, HyperTransport®, InfiniBand®, NuBus, etc.), and network interfaces 804 that include at least one wireless network interface (e.g., a WLAN interface, a Bluetooth® interface, a WiMAX interface, a ZigBee® interface, a Wireless USB interface, etc.).

The electronic device 800 also includes a WLAN device 808. The WLAN device 808 comprises a power management unit 820 and a connection management unit 822. The power management unit 820 and the connection management unit 822 implement functionality for determining and indicating (in a multicast ATIM frame) WLAN devices in an ad-hoc WLAN that should remain in an active power state. The power management unit 820 and the connection management unit 822 also implement functionality to read multicast ATIM frames received from other WLAN devices and determine whether or not the WLAN device 808 should remain in the active power state, as described with reference to FIGS. 1-7.

Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. Further, realizations may include fewer or additional components not illustrated in FIG. 8 (e.g., video cards, audio cards, additional network interfaces, peripheral devices, etc.). The processor unit 802 and the network interface 804 are coupled to the bus 810. Although illustrated as being coupled to the bus 810, the memory 806 may be coupled to the processor unit 802.

While the embodiments are described with reference to various implementations and exploitations, it will be understood that these embodiments are illustrative and that the scope of the inventive subject matter is not limited to them. In general, techniques for transmitting multicast ATIM frames for power management in an ad-hoc wireless system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for power management, the method comprising:
    identifying, by a first wireless network device, a second wireless network device that should remain in an active power state, wherein the first wireless network device and the second wireless network device are of a first plurality of wireless network devices in a first wireless network;
    determining, by the first wireless network device, a first network identifier associated with the second wireless network device;
    transmitting, by the first wireless network device, a first multicast message to the first plurality of wireless network devices, wherein the first multicast message comprises a header indicating the first network identifier, the first multicast message to cause the second wireless network device to remain in the active power state, receiving, at the first wireless network device a first beacon frame via a second wireless network having a second plurality of wireless network devices;

determining, by the first wireless network device, whether the second wireless network;

determining, by the first wireless network device, a second network identifier associated with the first wireless network device based, at least in part, on network; identifiers associated with the second plurality of wireless network devices;

transmitting, by the first wireless network device, a second beacon frame to the second plurality of wireless network devices, the second beacon frame comprising the second network identifier to indicate the first wireless network device has joined the second wireless network;

determining, by the first wireless network device, whether the first wireless network device will disconnect from the first wireless network;

transmitting, in a third beacon frame by the first wireless network device to a third wireless network device in the first wireless network, an indication that the first wireless network device has disconnected from the first wireless network if determined that the first wireless network device will disconnect from the first wireless network; and transmitting, by the first wireless network device to the third wireless network device, the first network identifier in the third beacon frame if determined that the first wireless network device will remain connected to the first wireless network.

2. The method of claim 1, further comprising generating the first multicast message, wherein the generating comprises:

identifying a network identifier bit in a sequence field of the header of the first multicast message that corresponds to the first network identifier; and setting the network identifier bit to a first value, wherein the first value indicates that the second wireless network device should remain in the active power state.

3. The method of claim 1, wherein
the header of the first multicast message comprises a first network identifier bit and a second network identifier bit,
the first network identifier bit corresponds to the first network identifier and has a first value to cause the second wireless network device to remain in the active power state,
the second network identifier bit corresponds to a third network identifier and is associated with a fourth wireless network device, and
the second network identifier bit includes a second value to cause the fourth wireless network device to enter an inactive power state.

4. The method of claim 1, wherein
the first wireless network comprises an ad-hoc wireless network,
the first multicast message is an announcement traffic indication map (ATIM) frame, and
the first plurality of wireless network devices are wireless local area network (WLAN) devices.

5. The method of claim 1, further comprising:
determining that a time-out interval has expired, wherein the time-out interval indicates a maximum time interval during which a fourth beacon frame is to be received from a fourth wireless network device;
determining the fourth beacon frame was not received from the fourth wireless network device before the time-out interval expired; and updating a connection table associated with the first wireless network to indicate the fourth wireless network device has disconnected from the first wireless network.

6. The method of claim 1, further comprising:
receiving, at the second wireless network device, a second multicast message from a fourth wireless network device, the second multicast message including a network identifier bit that corresponds to the second network identifier;
determining whether the network identifier bit comprises a first value;
maintaining the active power state of the first wireless network device if the network identifier bit comprises the first value; and
changing the active power state of the first wireless network device to an inactive power state if the network identifier bit comprises a second value.

7. The method of claim 1, wherein said determining whether the first wireless network device should join the second wireless network comprises determining whether a number of the second plurality of wireless network devices in the second wireless network is equal to a maximum allowable number of wireless network devices in the second wireless network.

8. The method of claim 1, wherein said identifying the second wireless network device determining that the first second wireless network device has data to be transmitted to a fourth wireless network device.

9. A first wireless network device of a first plurality of wireless network devices in a first wireless network, the first wireless network device comprising:
a processor;
a network interface in communication with the processor; and
a connection management unit in communication with the processor and to the network interface, the connection management unit to:
identify a second wireless network device that should remain in an active power state, wherein the second wireless network device is of the first plurality of wireless network devices;
determine a first network identifier associated with the second wireless network device;
transmit a first multicast message to the first plurality of wireless network devices, wherein the first multicast message comprises a header indicating the first network identifier, the first multicast message to cause the second wireless network device to remain in the active power state;
receive a first beacon frame via a second wireless network having a second plurality of wireless network devices:
determine whether to join the second wireless network,
determine a second network identifier associated with the first wireless network device based, at least in part, on network identifiers associated with the second plurality of wireless network devices; and
transmit a second beacon frame to the second plurality of wireless network devices, the second beacon frame comprising the second network identifier to indicate the first wireless network device has joined the second wireless network;
wherein the connection management unit is to:
determine whether the first wireless network device will disconnect from the first wireless network;
transmit, to a third wireless network device in the first wireless network, in a third beacon frame an indication that the first wireless network device has disconnected from the first wireless network if determined that the first wireless network device will disconnect from the first wireless network; and transmit, to the third wireless network device, the first network identifier in the third beacon frame if determined that that the first wireless network device will remain connected to the first wireless network.

10. The first wireless network device of claim 9, wherein the connection management unit to generate the first multicast message comprises the connection management unit to:

identify a network identifier bit in a sequence field of the header of the first multicast message that corresponds to the first network identifier associated with the second wireless network device; and set the network identifier bit to a first value, wherein the first value indicates that the second wireless network device should remain in the active power state.

11. The first wireless network device of claim 9, wherein the header of the first multicast message comprises a first network identifier bit and a second network identifier bit, the first network identifier bit corresponds to the first network identifier and has a first value to cause the second wireless network device to remain in the active power state, a second network identifier bit corresponds to a third network identifier and is associated with a fourth wireless network device, and the second network identifier bit includes a second value to cause the fourth wireless network device to enter an inactive power state.

12. The first wireless network device of claim 9, wherein the first wireless network comprises an ad-hoc wireless network, wherein the first multicast message is an announcement traffic indication map (ATIM) frame, and the first plurality of wireless network devices are wireless local area network (WLAN) devices, wherein the connection management unit is to:

determine that a time-out interval has expired, wherein the time-out interval indicates a maximum time interval during which a fourth beacon frame is to be received from a fourth wireless network device;

determine the fourth beacon frame was not received from the fourth wireless network device before the time-out interval expired; and update a connection table associated with the ad-hoc wireless network to indicate the fourth wireless network device has disconnected from the ad-hoc wireless network.

13. The first wireless network device of claim 9, comprising a power management unit to:

receive a second multicast message from a fourth wireless network device, the second multicast message including a network identifier bit that corresponds to the second network identifier;

determine whether the network identifier bit comprises a first value;

maintain an active power state of the first wireless network device if the network identifier bit comprises the first value and change the active power state of the first wireless network device to an inactive power state if the network identifier bit comprises a second value.

14. A non-transitory machine-readable storage medium, having instructions stored therein, which when executed by at least one processor of a first wireless network device causes the at least one processor to perform operations that comprise:

identifying a second wireless network device that should remain in an active power state, wherein the first wireless network device and the second wireless network device are of a first plurality of wireless network devices in a first wireless network;

determining a first network identifier associated with the second wireless network device;

transmitting a multicast message to the first plurality of wireless network devices, wherein the multicast message comprises a header indicating the first network identifier, the multicast message to cause the second wireless network device to remain in the active power state;

receiving a first beacon frame via a second wireless network having a second plurality of wireless network devices;

determining whether to join the second wireless network;

determining a second network identifier associated with the first wireless network device based, at least in part, on determining on network identifiers associated with the second plurality of wireless network devices;

transmitting a second beacon frame to the second plurality of wireless network devices the second beacon frame comprising the second network identifier to indicate the first wireless network device has joined the second wireless network;

determining whether the first wireless network device will disconnect from the first wireless network;

transmitting, to a third wireless network device in the first wireless network, in a third beacon frame an indication that the first wireless network device has disconnected from the first wireless network if determined that the first wireless network device will disconnect from the first wireless network; and transmitting, to the third wireless network device, the first network identifier in the third beacon frame if determined that the first wireless network device will remain connected to the first wireless network.

15. The non-transitory machine-readable storage medium of claim 14, wherein the instructions when executed by the at least one processor causes the at least one processor to perform further operations that comprise:

identifying a network identifier bit in a sequence field of the header of the multicast message that corresponds to the first network identifier; and setting the network identifier bit to a first value, wherein the first value indicates that the first wireless network device should remain in the active power state.

16. The non-transitory machine-readable storage medium of claim 14, wherein the header of the multicast message comprises a first network identifier bit and a second network identifier bit, the first network identifier bit corresponds to the first network identifier and has a first value to cause the second wireless network device to remain in the active power state, the second network identifier bit corresponds to a third network identifier and is associated with a fourth wireless network device, and the second network identifier bit includes a second value to cause the fourth wireless network device to enter an inactive power state.

17. The non-transitory machine-readable storage medium of claim 14, wherein the first wireless network comprises an ad-hoc wireless network, the multicast message is an announcement traffic indication map (ATIM) frame, and the first plurality of wireless network devices are wireless local area network (WLAN) devices.

* * * * *